United States Patent
Diengsleder-Lambauer

(10) Patent No.: US 10,541,587 B2
(45) Date of Patent: Jan. 21, 2020

(54) DEVICE FOR GENERATING ELECTRICAL ENERGY FROM A ROTATIONAL MOVEMENT

(71) Applicant: ALKAPAT GMBH, Raaba-Grambach (AT)

(72) Inventor: Carmen Viola Diengsleder-Lambauer, Tillmitsch (AT)

(73) Assignee: ALKAPAT GMBH, Raaba-Grambach (AT)

( * ) Notice: Subject to any disclaimer, the term of this patent is extended or adjusted under 35 U.S.C. 154(b) by 264 days.

(21) Appl. No.: 15/738,054

(22) PCT Filed: Jan. 13, 2016

(86) PCT No.: PCT/AT2016/050004
§ 371 (c)(1),
(2) Date: Dec. 19, 2017

(87) PCT Pub. No.: WO2016/112420
PCT Pub. Date: Jul. 21, 2016

(65) Prior Publication Data
US 2018/0138782 A1     May 17, 2018

(30) Foreign Application Priority Data
Jan. 13, 2015   (AT) .............. A 50020/2015

(51) Int. Cl.
*F02B 63/04*     (2006.01)
*H02K 7/18*     (2006.01)
*B60C 23/04*     (2006.01)

(52) U.S. Cl.
CPC ............ *H02K 7/1846* (2013.01); *B60C 23/04* (2013.01)

(58) Field of Classification Search
CPC .... H02K 7/1846; H02K 16/005; H02K 35/00; H02K 7/1892
See application file for complete search history.

(56) References Cited

U.S. PATENT DOCUMENTS 4,103,194 A    7/1978   Anderson
4,300,120 A   11/1981   Surman
(Continued)

FOREIGN PATENT DOCUMENTS

DE   27 21 415    12/1977
DE   2 744 269     4/1978
(Continued)

OTHER PUBLICATIONS

Swanley et al., "Active Three Phase Rectifier Features 0.1V Drop", Electronics World, Nexus Media Communications, GB, vol. 103, No. 1732, XP000721941, ISSN: 0959-8332, Apr. 1, 1997, pp. 323.
(Continued)

*Primary Examiner* — Tulsidas C Patel
*Assistant Examiner* — Thomas K Quigley
(74) *Attorney, Agent, or Firm* — Greenblum & Bernstein, P.L.

(57) ABSTRACT

The invention relates to a device (1) for generating electrical energy from a rotational movement, comprising a stator (3) which can rotate about a rotational axis and a rotor (4) which can rotate about the rotational axis (2) and is connected to the stator (3), which rotor comprises a centre of gravity (5) located outside the rotational axis (2), wherein in the stator (3) a coil is arranged for inducing an electrical voltage when the stator (3) is rotated relative to the rotor (4), wherein an electrical circuit (7) is connected to the coil, said circuit comprising an energy store (6) for rectifying the voltage induced in the coil. In order to achieve a maximum energy yield under various conditions of use, according to the
(Continued)

Figure 1:
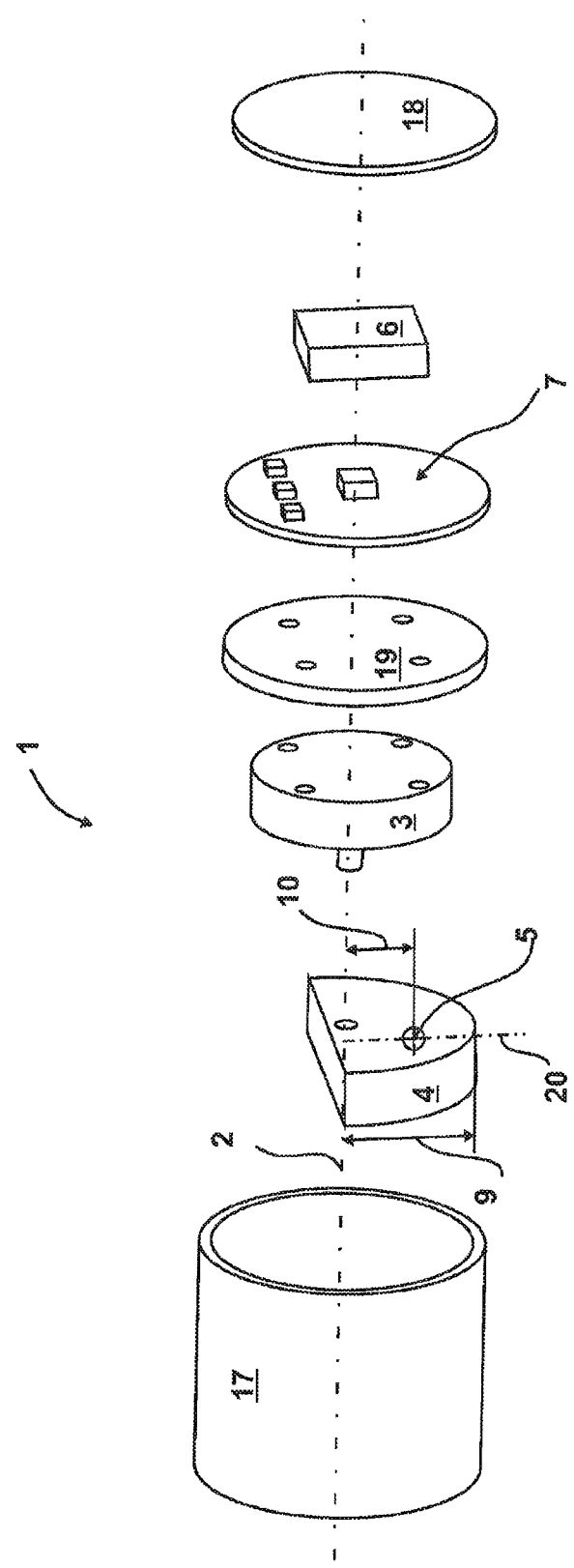

invention, the device (1) is configured to detect a position of a plane defined by the rotational axis (2) and the centre of gravity (5) of the rotor (4) and to influence the position of the plane by means of a current flow through the coil, so that a deflection of the plane from the vertical can be limited by the current flow during a rotation of the stator (3). The invention also relates to a use of a such a device (1).

26 Claims, 5 Drawing Sheets

(56) References Cited

U.S. PATENT DOCUMENTS

| | | | | |
|---|---|---|---|---|
| 4,761,577 | A * | 8/1988 | Thomas | B60B 19/00 |
| | | | | 310/67 A |
| 7,001,053 | B1 | 2/2006 | Chieh et al. | |
| 8,026,622 | B2 * | 9/2011 | Thackston | F03B 13/264 |
| | | | | 290/43 |
| 8,324,748 | B2 * | 12/2012 | Thackston | F03B 13/264 |
| | | | | 290/43 |
| 8,674,528 | B2 * | 3/2014 | Kobayakawa | B60C 23/041 |
| | | | | 290/1 R |
| 2010/0327582 | A1 | 12/2010 | Thackston | |
| 2011/0309619 | A1 | 12/2011 | Thackston | |
| 2012/0049524 | A1 | 3/2012 | Nikolic | |
| 2013/0221680 | A1 | 8/2013 | Mian et al. | |
| 2015/0137525 | A1 | 5/2015 | Nikolic | |

FOREIGN PATENT DOCUMENTS

| | | |
|---|---|---|
| DE | 20 2010 008 236 | 11/2010 |
| WO | 86/04308 | 7/1986 |
| WO | 2008/012850 | 1/2008 |
| WO | 2010/129886 | 11/2010 |

OTHER PUBLICATIONS

Austria Office Action conducted in counterpart Austria Appln. No. A 50020/2015 (dated Jan. 12, 2016) (w/ machine translation).

* cited by examiner

DEVICE FOR GENERATING ELECTRICAL ENERGY FROM A ROTATIONAL MOVEMENT

The invention relates to an apparatus for generating electrical energy from a rotational movement, comprising a stator that can rotate about a rotation axis and a rotor that can rotate about the rotation axis and is connected to the stator, which rotor comprises a center of gravity located outside the rotation axis, wherein in the stator a coil is arranged for inducing an electrical voltage when the stator is rotated relative to the rotor, wherein an electrical circuit is connected to the coil, said circuit comprising an energy store for rectifying the voltage induced in the coil.

Furthermore, the invention relates to a use of an apparatus of this type.

From the prior art, various apparatuses for generating electrical energy from a rotational movement are known, for example, for supplying energy to a pressure sensor in a wheel of a motor vehicle to monitor tire pressure. Accordingly, piezoelectric apparatuses for use in the tire of a wheel on a motor vehicle have become known, wherein a cyclical deformation of the tire is used for a generation of energy.

Furthermore, apparatuses of the type named at the outset have become known which comprise a rotating electrical machine. In contrast to stationary rotating machines, in which the stator is connected in a fixed manner to a base or the like, a stator in an apparatus of the type named at the outset is arranged rotatably and placed in a rotational movement to generate energy. Due to an eccentric center of gravity in at least one position of the rotation axis, for example, when the rotation axis is aligned horizontally, the rotor which can rotate freely and is connected to the stator has a defined resting position in which the center of gravity of the rotor is located perpendicularly below the rotation axis. Thus, when the stator is rotated, the rotor is stabilized in the resting position by the eccentric center of gravity in combination with the gravitational force acting on the rotor. As a result, the rotor remains in the resting position due to the gravitational force, even when the stator rotates about the rotation axis, if no moment is transmitted between the rotor and stator. This leads to a relative movement between the rotor and stator about the rotation axis. In order to achieve an induction of an electrical voltage in the coil when the stator is rotated relative to the rotor, a device for generating a magnetic field, typically one or more permanent magnets or an excitation winding, is provided in the rotor of a rotating electrical machine. Thus, when the stator is rotated relative to the rotor, a voltage is induced in the coil of the stator. If a load is applied to the coil, a current flowing in the coil causes a moment or torque acting between the rotor and stator. This moment, and thus the maximum electrical power attainable with the apparatus, is defined by a gravitational force which acts on the apparatus, and a mass and an eccentricity of the rotor or a distance of the center of gravity of the rotor from the rotation axis.

When the apparatus is operated in a working point in which a power outputted by the apparatus is at a maximum, the rotor is deflected 90° from the resting position so that an imaginary plane that is defined by the rotation axis and the center of gravity of the rotor is horizontal in the case of a horizontal rotation axis. In this working point, a further increase in the moment acting between the rotor and stator would lead to a co-rotation by the rotor, and thus to a reduction in the attainable electrical power. Furthermore, a co-rotation by the rotor would result in damage to the rotor, which in contrast to the stator is not designed for such large centrifugal forces. In apparatuses of this type, a maximum power is therefore limited by an eccentricity of the rotor. Apparatuses of this type from the prior art are not suitable for supplying energy to a tire pressure sensor, since on the one hand a rotation by the rotor cannot be reliably prevented due to widely varying driving conditions. On the other hand, such apparatuses have an adversely large installation footprint for generating adequately large voltages, which footprint is unsuitable for a use in a rim of a wheel.

This is addressed by the invention. The object of the invention is to specify an apparatus of the type named at the outset that is suitable for supplying energy to electrical devices in a wheel of a motor vehicle. For this purpose, the apparatus is to have a small installation footprint. Furthermore, it is to be ensured that damage to the rotor is also prevented under different operating conditions. Additionally, a use of an apparatus of this type is to be specified.

The first object is attained according to the invention by an apparatus of the type named at the outset which is configured to detect a position of a plane defined by the rotation axis and the center of gravity of the rotor and to influence the position of the plane by means of a current flow through the coil, so that a deflection of the plane from a vertical line can be limited by the current flow when the stator rotates.

When embodied accordingly, the apparatus can also be used to generate electrical energy in a tire of a motor vehicle, for example, a passenger car or a motorcycle, wherein a force that stabilizes the rotor and defines a maximum moment, and thus a maximum power, is subjected to oscillations in particular as a result of a changing tilt of the tire or changing accelerations during uphill or downhill driving. Because the apparatus is embodied to detect a deflection of a plane that is defined by the center of gravity of the rotor and a rotation axis, or a position of the center of gravity of the rotor relative to the rotation axis, the apparatus can, even with a changing deflection of the rotation axis from a horizontal line or an acceleration in a vertical direction, in each case be operated such that a maximum amount of electrical energy is generated. At the same time, a co-rotation by the rotor, which would destroy the rotor as a result of occurring centrifugal forces, can be prevented. It is thus sufficient for a mechanical stability of the apparatus that the stator is designed to be adequately stable for centrifugal forces occurring during a rotation about the rotation axis, whereby the apparatus can be implemented in a small installation footprint. Of course, the plane is an imaginary plane which is defined by the rotation axis and the center of gravity of the rotor, or on which the rotation axis and the center of gravity of the rotor lie.

A detection of the position of the imaginary plane can occur in many different ways. For example, the position of the rotor, and thus the position of the plane, can be determined easily using the voltages induced in the rotating stator, since the induced voltages result directly from the known magnetic field of the rotor and a position of the rotor. Further possibilities for detecting the position of the plane are an optical or mechanical detection of a position of the rotor. Finally, a sensor such as an accelerometer can also be provided on the rotor to detect an alignment of the rotor which, for example, is wirelessly supplied with energy and wirelessly transmits position data.

In order to influence the position of the plane by means of a current flow, the circuit is usually embodied such that a power outputted by the apparatus is no longer increased when the plane reaches a defined deflection from a vertical line that corresponds to a resting position of the rotor. Thus, the center of gravity of the rotor lies vertically below the rotation axis in the resting position. In order to also prevent a co-rotation by the rotor in the case of a significant tilting of the rotation axis or a vertically aligned rotation axis, the circuit can also be embodied to apply a current from the energy store to the coil. In this manner, a magnetic field of the stator can be used to keep the rotor in a defined alignment or to prevent a co-rotation.

To prevent damage to the rotor from a centrifugal force occurring during a rotation, it has proven effective that a deflection of the plane is limited to a deflection angle of maximally 180°, in particular maximally 90°, from a resting position.

If the plane is deflected 90° from the resting position, a moment for maintaining the deflection or a power attainable with the apparatus is at a maximum, since a distance between the rotation axis and the center of gravity of the rotor in a direction perpendicular to a gravitational force vector is then at a maximum. It has therefore proven effective to limit the deflection to maximally 90°.

To achieve an apparatus with a small size and at the same time a high attainable electrical power, it is beneficial if a distance of the center of gravity of the rotor from the rotation axis is equal to more than 10%, preferably more than 20%, in particular more than 40%, of a maximum distance of the rotor from the rotation axis. For example, the rotor can have a semicircular cross-section or the like in a section perpendicular to the rotation axis. Alternatively, the rotor can also be embodied as a cylinder with an inhomogeneous mass distribution, so that the center of gravity is spaced from a rotation axis of the cylinder. If the rotor is formed by a semi-cylinder, for example, a distance of the center of gravity from the rotation axis is approximately 42% of a maximum distance of the rotor from the rotation axis. A maximum distance of the rotor from the rotation axis thereby corresponds to a radius of the semi-cylinder.

To generate electrical energy from a rotational movement, the stator is embodied such that it can rotate. This means that the stator is embodied with sufficient mechanical strength for centrifugal forces occurring during a rotation about the rotation axis. For a use of the apparatus in a tire or a rim of a motor vehicle, it is beneficial if the stator is embodied for rotation about the rotation axis at a rotational speed of more than 100 rpm, preferably more than 500 rpm, in particular more than 1500 rpm. Of course, other components of the apparatus that rotate along with the stator during operation, such as the circuit, are also advantageously embodied for continuous loading with corresponding centrifugal forces.

Preferably, a tilt sensor for detecting a slope of the rotation axis is provided. In this manner, a maximum electrical power attainable with the apparatus can be determined easily, since a maximum moment between the rotor and stator at which the rotor does not co-rotate depends on a slope of the rotation axis and decreases in a deflection of the rotation axis from a horizontal line. If a tilt sensor is provided, a position of the imaginary plane or a position of the rotor can be determined easily using a power outputted by the apparatus or a current through the coil, which current is proportional to a moment between the rotor and stator. From the moment transmitted between the rotor and stator and the slope of the rotation axis, an actual deflection of the imaginary plane or of the rotor results directly, which deflection follows from the moment. Thus, by means of the tilt sensor, a control of the apparatus for attaining an optimal power output is simplified.

Typically, the tilt sensor is embodied as an accelerometer. Multiple accelerometers can also be provided for detecting in different spatial directions an acceleration or force of gravity that acts on the apparatus, for example, to determine with particular accuracy a maximum attainable moment at which the rotor still does not co-rotate during cornering or during an accelerated uphill or downhill movement. Advantageously, at least two accelerometers arranged perpendicularly to one another are arranged on a plane positioned perpendicularly to the rotation axis and are connected to the stator in a fixed manner in order to be able to determine with particular accuracy the gravitational force vector relative to the stator or a position of the rotation axis.

It can also be provided that an inertial sensor is connected to the stator, with which sensor linear accelerations in three spatial directions positioned perpendicularly to one another, rotational accelerations about three axes position perpendicularly to one another, and a strength of a magnetic field in the three spatial directions can be measured. This results in nine measurands for the particularly accurate determination of a spatial position of the stator or a determination of the gravitational force vector relative to the stator, wherein a geomagnetic field can also be accounted for.

To determine a position of the rotor relative to the stator or a spatial position of the plane with a known position of the stator, an angle sensor can for example be provided with which an angle between the rotor and stator can be measured. The angle sensor can comprise a Hall sensor on the rotor and a magnetic dipole on the stator, so that a deflection of the rotor relative to the stator can be measured by the Hall sensor using the magnetic dipole. Of course, the Hall sensor can also be arranged on the stator and the magnetic dipole on the rotor. In this manner, the positions of the stator, rotor and imaginary plane can be easily determined at any time both spatially and also relative to the gravitational force vector.

Alternatively or additionally, an angle measurement can also occur by means of an optical measuring technique known from the prior art or via the voltages induced in the coils, in order to determine the location or position of the rotor spatially and relative to the stator.

To prevent a co-rotation by the rotor in the case of a significant tilting of the apparatus, it is beneficial if the apparatus is embodied to limit a current through the coil depending on a slope of the rotation axis. With a horizontally aligned rotation axis, a maximum moment is thus attainable, whereas the gravitational force does not have a stabilizing effect on the rotor when the rotation axis is aligned vertically. Typically, the current through the coil is limited proportionally to a stabilizing effect of the gravitational force or a moment caused by the gravitational force for the deflection of the rotor about the rotation axis.

In order to also prevent a co-rotation by the rotor in the case of a significant tilting of the rotation axis or a vertical alignment of the rotation axis, it is beneficial if a deflection of the plane can be influenced by means of an energy from the energy store. Since there is no stabilizing effect of the gravitational force on the rotor during a significant deflection or vertical alignment of the rotation axis, a stabilizing effect of this type can be achieved with an apparatus according to the invention by means of a targeted current flow in the at least one coil of the stator. In this manner, the apparatus can also be used to monitor tire pressure in the wheel of a two-wheeled vehicle, such as a motorcycle, that is tilted significantly during cornering.

Typically, more than one coil is provided in the stator. To achieve in a simple manner a high energy yield on the one hand and a particularly suitable controllability of a position of the rotor on the other hand, it is beneficial if two to six, in particular three, coils are provided in the stator. As is the case with rotating electrical machines from the prior art, the coils are thereby normally evenly distributed in the stator. With rotating electrical machines, in contrast to direct current machines, no brushes are required for commutation. Thus, with an apparatus according to the invention, the disadvantages caused by brushes, such as wear, short service life, reduced efficiency due to frictional losses, brush sparking, etc. are eliminated. At the same time, an application of an opposing moment for stabilizing the rotor is already possible at a particularly low voltage.

A rectification of the alternating voltage induced in the coil can in principle occur in widely varied manner, for example, by means of diodes or tubes. For the targeted achievement of a current flow in the coil or coils that influences a deflection of the imaginary plane, it has proven beneficial if the circuit comprises at least one transistor, in particular a MOSFET, for rectifying the voltage induced in the coil. With a switch such as a transistor, a load can be connected to a coil in a targeted manner, for example, to achieve a current flow in the coil, and thus an influencing of the position of the rotor or the position of the imaginary plane via a magnetic field caused by the current flow, depending on an actual deflection of the imaginary plane. Typically, all coils are connected to transistors for the rectification. As is typical for rotating electrical machines, it can be provided that the coils of the stator are connected to form a star connection or delta connection, so that with three coils, only six transistors are necessary for rectifying the voltages induced in the coils.

Advantageously, transistors embodied as MOSFETs are used, which are also referred to as metal-oxide-semiconductor field-effect transistors, since these transistors exhibit a very low voltage drop compared to conventional diodes, for example. In this manner, low voltages which occur at low rotational speeds of the stator relative to the rotor and/or a small outer diameter of the stator can already be used for electrical consumers. When the apparatus is used in a wheel of a motor vehicle, an energy generation by the apparatus is thus already possible at low speeds for operating a tire pressure sensor.

For rectification, connecting terminals of the coils are typically connected to the connection points in the circuit which are connected to a first voltage level via one transistor each and to a second voltage level of an intermediate circuit in the circuit via another transistor. The energy store is normally connected to the intermediate circuit, which can also be referred to as a direct current circuit, so that a voltage between the first voltage level and the second voltage level is equal to a voltage of the energy store. The voltage between the first voltage level and second voltage level is thus normally a direct current voltage or a mixed voltage with a high direct current voltage component. To ensure that the energy store is charged by a voltage induced in the coils, it is beneficial if an operational amplifier connected to the transistor and to an intermediate circuit and the coil is provided, so that a switching of the transistor by the operational amplifier can occur depending on a voltage between the coil and the intermediate circuit. Thus, an undesired current flow from the energy store into the coil is prevented in a simple manner, since the transistors are not switched by the operational amplifiers until a voltage of the coil is above a voltage level of the respective voltage level of the intermediate circuit.

Alternatively or additionally, a microcontroller can also be provided for controlling the transistor. Of course, if multiple transistors are used, all transistors can be controlled by one or more microcontrollers. Thus, among other things, a targeted current flow from the energy store into the coil, for example, to stabilize a position of the rotor, is possible in a simple manner.

In order to also be able to use low voltage generated at low rotational speeds, it is beneficial if a voltage converter, in particular a step-up converter, is provided to transform an output voltage of the intermediate circuit into a higher value. For example, a voltage converter of this type can be used to supply a system voltage level that has a higher voltage than the intermediate circuit at low rotational speeds, from which level components such as operational amplifiers can be supplied for controlling the transistors. It is thus possible to achieve a rectification with high efficiency even at very low voltages or low rotational speeds.

Even if widely differing possibilities exist for the use of an apparatus according to the invention, it is particularly beneficial if, in the case of a rim, in particular an automobile rim, having an apparatus for generating electrical energy from a rotational movement, the apparatus is embodied according to the invention. On the one hand, a higher electrical power is thus attainable than with piezoelectric devices from the prior art, so that in addition to a tire pressure sensor, other electrical devices can be operated in the wheel. On the other hand, the apparatus is also particularly sturdy and suitable for use under widely different temperatures and use conditions.

For a use of the apparatus on or in a rim of a vehicle, it has proven effective that the apparatus is arranged in the center of the rim so that a rotation axis of the rim coincides with the rotation axis of the apparatus. Thus, an arrangement of the apparatus in the rim does not lead to an imbalance of the rim, as a result of which higher driving comfort is achieved. In addition, by positioning the apparatus in the center of the rim, a visual appearance of the rim is not impaired if the apparatus is embodied to be correspondingly small. Typically, the apparatus is embodied with an outer diameter of less than 15 cm, so that the apparatus can be arranged in a recess of the rim between fixing screws with which the rim is attached to the vehicle.

It is beneficial if a sensor is provided for detecting a physical property of a tire mounted on the rim, in particular a pressure sensor, which sensor is connected to the apparatus for the purpose of energy supply. The apparatus can thus be used for tire pressure monitoring.

To transmit a physical property detected by the sensor to an on-board electronics of the vehicle, for example, it is preferably provided that a device for wireless data transmission is provided. Normally, a corresponding receiver is then provided in a non-rotating part of the vehicle, which receiver forwards the data to the on-board electronics. The transmission can thereby occur via radio or induction, wherein a retrofitting of existing vehicles with corresponding data transmission devices is also possible. If the data transmission occurs by means of induction through opposing coils or loops, a high interference immunity is achieved, as a result of which safety-related data can also be transmitted.

Because a significantly higher electrical power can be generated with an apparatus according to the invention than with piezoelectric apparatuses from the prior art, it has proven advantageous if a compressor for influencing a tire pressure is provided, wherein the compressor is connected to the apparatus for the purpose of energy supply. The apparatus thus can be used not only for tire pressure monitoring, but also to influence the tire pressure. For example, the compressor can be activated precisely when a tire pressure drops below a defined limit value. Of course, other actuators can also be provided, for example, in order to reduce a tire pressure in a targeted manner as needed, if this is necessary.

The other object is attained according to the invention in that the apparatus according to the invention for generating electrical energy is used in a wheel of a motor vehicle. An energy yield can thus be achieved wherein even under widely varying operating conditions, such as a tilting of the wheel, a maximum amount of electrical energy can be generated.

Figure 2:
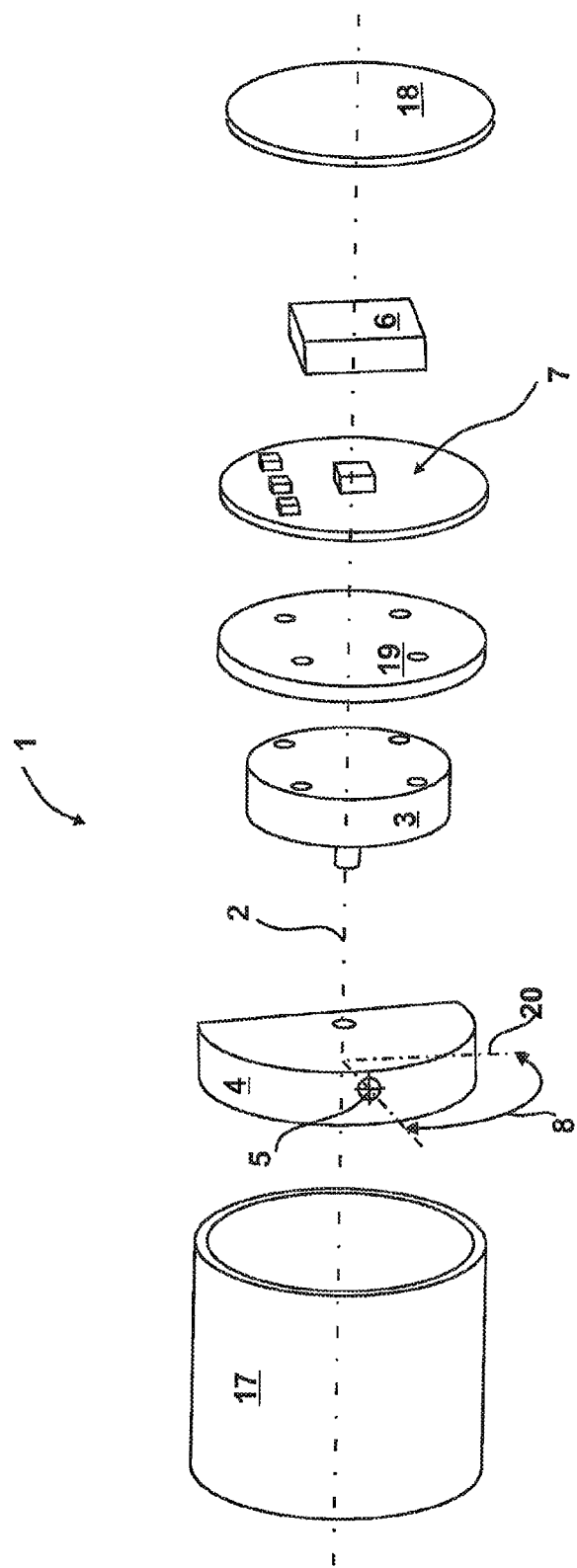
Figure 3:
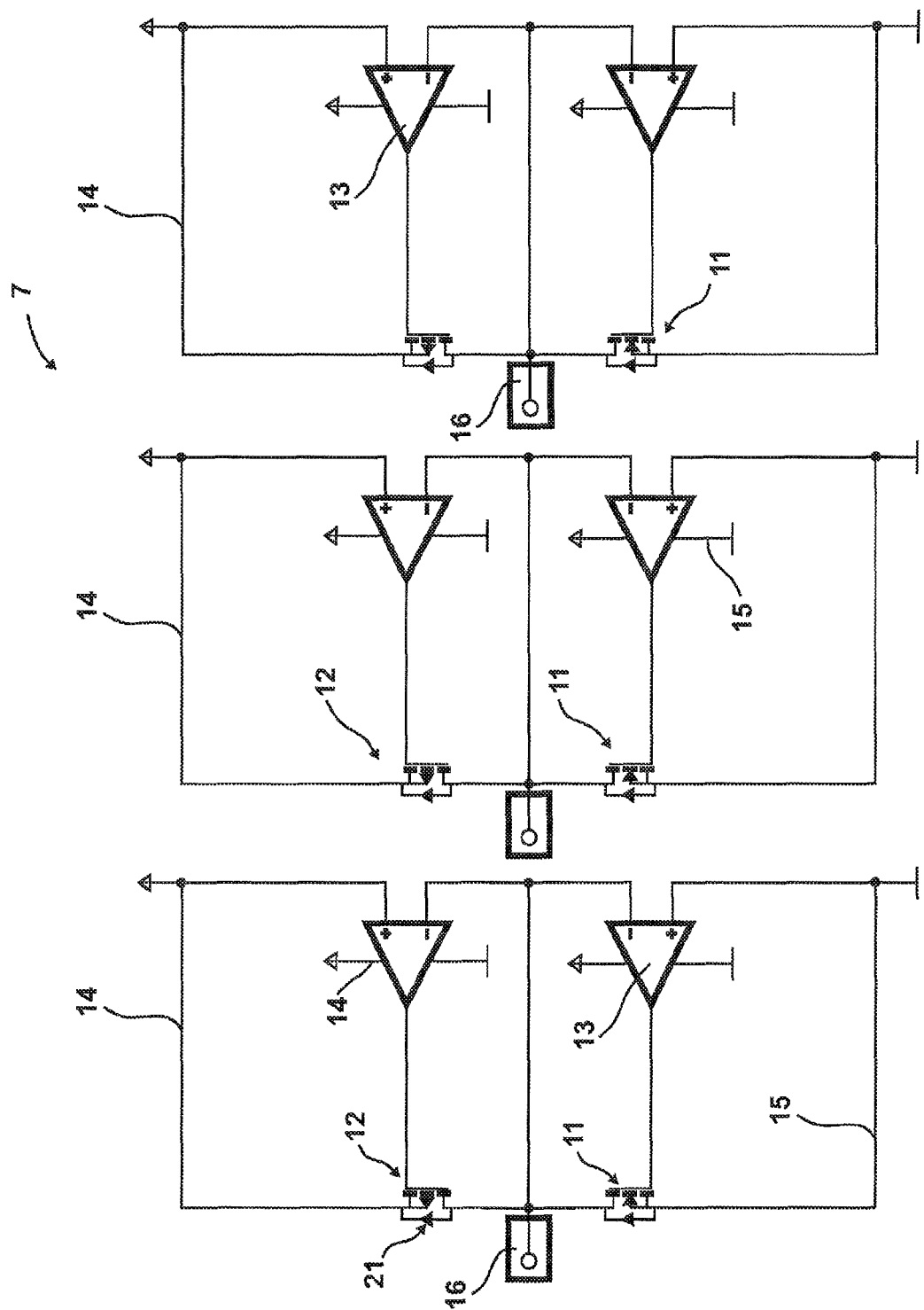
Figure 4:
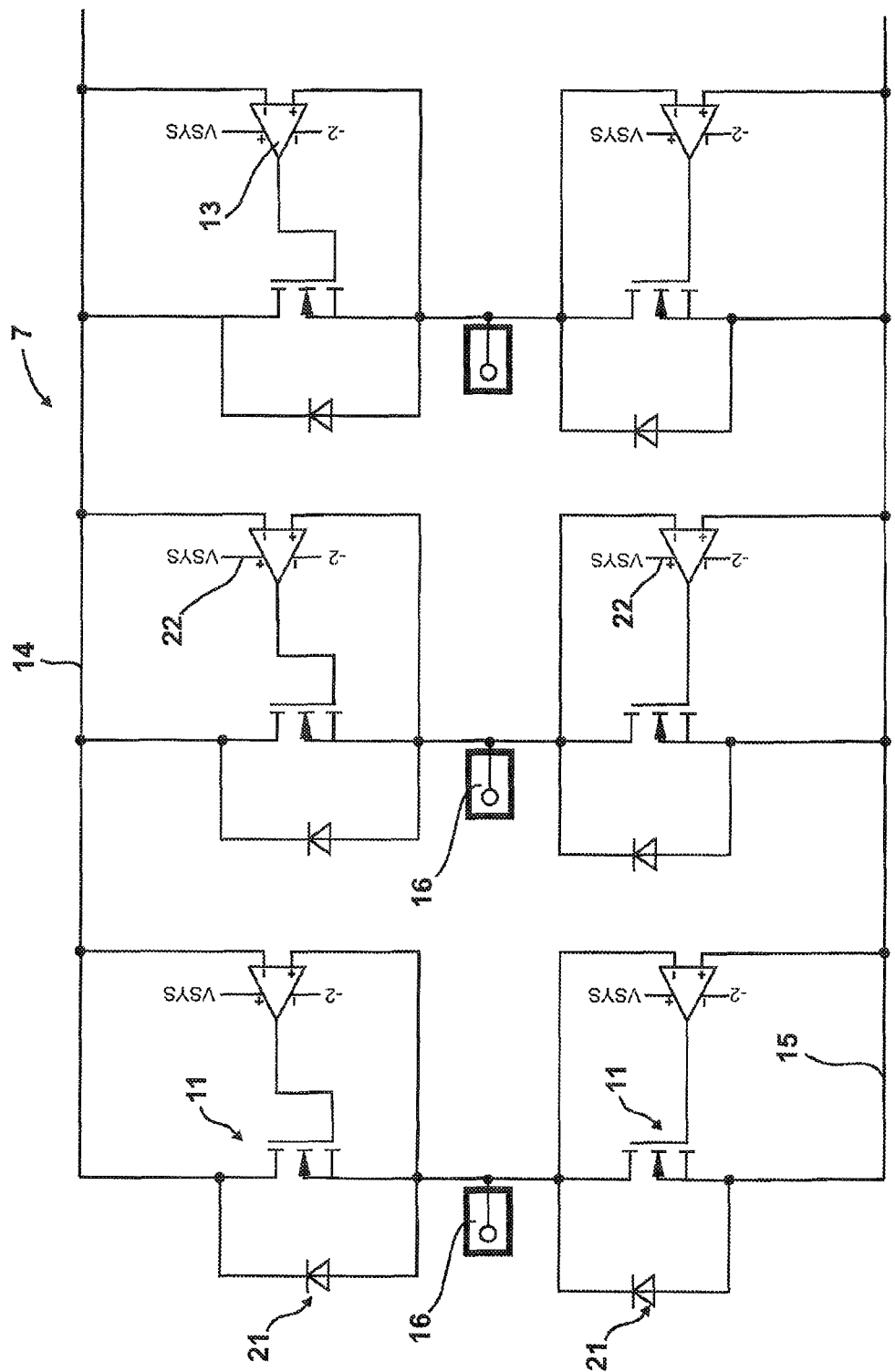
Figure 5:
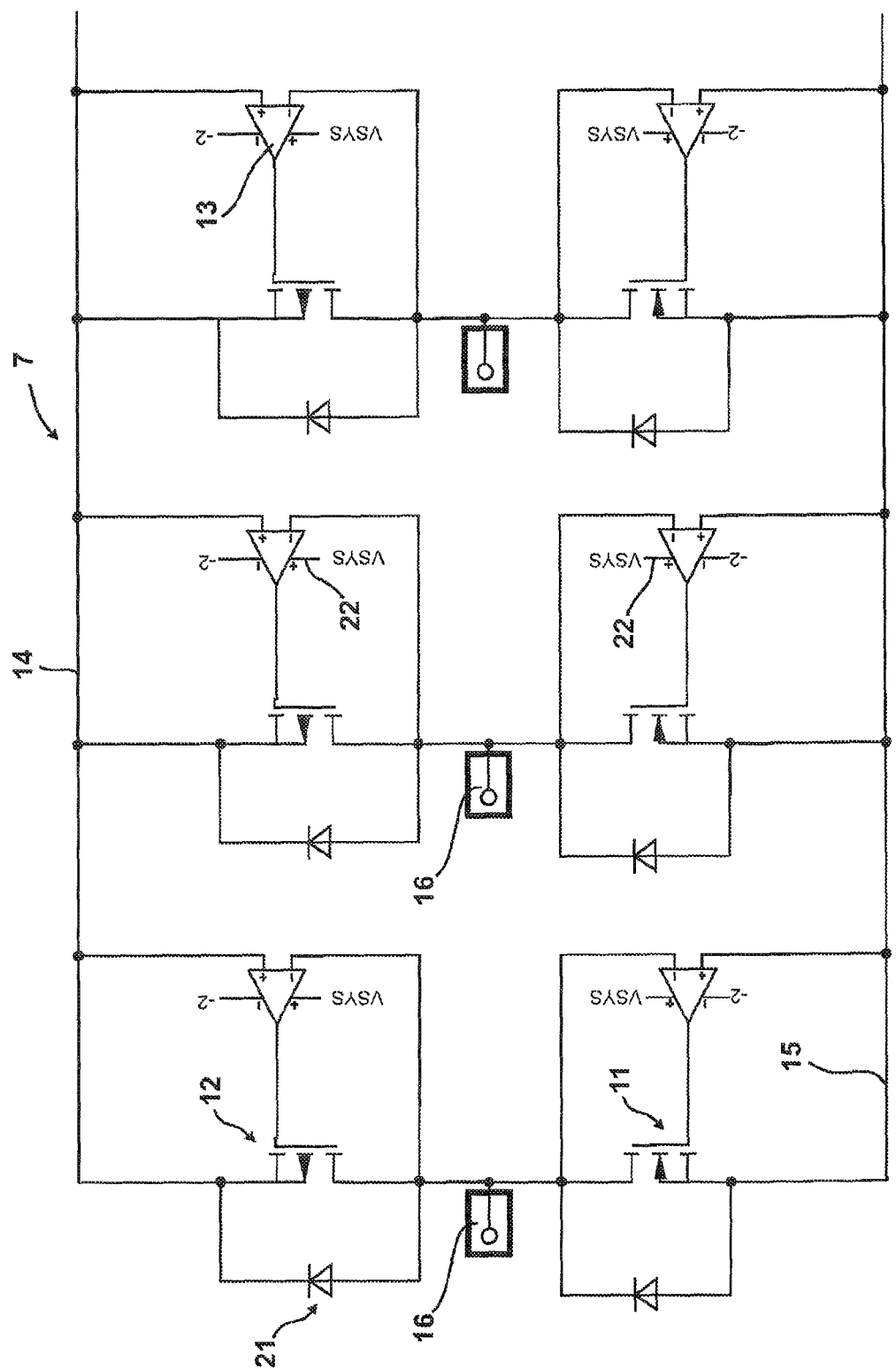

Additional features, advantages and effects of the invention follow from the exemplary embodiments described below. The drawings which are thereby referenced show the following:

FIGS. 1 and 2 An apparatus according to the invention in different operating states;

FIGS. 3 through 5 Various exemplary embodiments of an electrical circuit of an apparatus according to the invention.

FIGS. 1 and 2 schematically show an exploded view of an apparatus 1 according to the invention for generating electrical energy from a rotational movement in different operating states. As can be seen, the apparatus 1 comprises a rotating electrical machine with a rotor 4 having a roughly semicircular cross-section. Furthermore, a stator 3 is provided that is connected to the rotor 4 such that it can rotate about an rotation axis 2, in which stator three coils, which are not illustrated, are arranged for inducing an electrical voltage during a relative rotation between the rotor 4 and the stator 3. For this purpose, permanent magnets are provided in the rotor 4. In order to also achieve a highest possible electrical voltage with small dimensions and/or low rotational speeds, multiple permanent magnets are normally provided, so that the rotor 4 preferably has a pole pair number of 2 to 20. In the illustrated rotor 4, the pole pair number is twelve.

To connect the apparatus 1 to a rotating system in which the apparatus 1 is positioned for generating electrical energy, a roughly hollow-cylindrical outer shell 17 is provided. This outer shell 17 can, for example, be arranged in a central recess in a center of a rim of a wheel on a vehicle and connected to the rim in a fixed manner, so that the outer shell 17 rotates along with the rim. In this case, a rotation axis 2 of the rim coincides with a rotation axis 2 of the apparatus 1. The outer shell 17 is connected in a fixed manner to the stator 3 via a connecting element 19, so that when the apparatus 1 is operated in a rotating system such as a rim, the stator 3 has a rotational speed of the rotating system. The designations rotor 4 and stator 3 thus correspond to the nomenclature typical for rotating electrical machines, but in contrast to stationary rotating electrical machines, do not in this case indicate a kinematic behavior of the respective components during operation of the apparatus 1.

When the apparatus 1 is at a standstill, or during operation in which no moment is transmitted between the rotor 4 and the stator 3 so that current also does not flow through the coils of the stator 3, the rotor 4 is in a resting position as illustrated in FIG. 1, wherein a center of gravity 5 of the rotor 4 is positioned perpendicularly below the rotation axis 2. An imaginary plane which is defined by the rotation axis 2 and the center of gravity 5 of the rotor 4 or contains the rotation axis 2 and the center of gravity 5 thus lies vertically in the resting position, so that a deflection angle in the resting position is 0°.

Due to the roughly semicircular cross-section of the rotor 4, the center of gravity 5 of the rotor 4 does not lie on the rotation axis 2, so that there results a distance 10 between the center of gravity 5 of the rotor 4 and the rotation axis 2. A maximum distance 9 of the rotor 4 from the rotation axis 2 corresponds to a radius of the semicircular cross-section. Typically, a ratio of the distance 10 of the center of gravity 5 to the rotation axis 2 to a maximum distance 9 of the rotor 4 from the rotation axis 2 is greater than 10%, preferably 30% to 50%, in particular approximately 40%. Thus, an especially high moment is necessary to deflect the rotor 4 from the resting position, whereby a high electrical power can be generated with the apparatus 1.

If electrical energy is generated so that a current flows through the coils, a moment transmitted onto the rotor 4 from the stator 3 causes a deflection of the rotor 4, which can also be referred to as inertial mass. A maximum moment or a maximum power is thereby reached when the imaginary plane is deflected from the resting position by a deflection angle 8 of 90°, or when the center of gravity 5 of the rotor 4 is at the same height as the rotation axis 2. An operating state of this type, in which the deflection angle 8 by which the imaginary plane is deflected from an orthogonal line 20 is approximately 90°, is shown again in an exploded view in FIG. 2.

The apparatus 1 is embodied to detect and influence a position of the plane by means of a current flow through the at least one coil in the stator 3. For this purpose, a circuit 7 is provided with which a defined current flow through the coils can be achieved in order to influence a position of the imaginary plane. The electronic circuit 7 is connected to the stator 3 in a fixed manner and, like the stator 3, is also embodied for continuous loading with centrifugal forces that can occur at a rotational speed typical for wheels of a motor vehicle. The electrical current 7 is also used to rectify an alternating voltage induced in the coils. For this purpose, an energy store 6, such as a rechargeable battery, capacitor or battery, that is connected to an intermediate circuit is provided. To protect the apparatus 1 against contamination, a lid 18 which tightly seals the outer shell 17 is provided.

FIG. 3 shows an exemplary embodiment of a circuit 7 of the apparatus 1 illustrated in FIG. 1. On the one hand, three connection points 16 are provided to connect the coils of the stator 3 which are typically connected to form a delta connection or a star connection. On the other hand, an intermediate circuit can be seen, to which circuit an energy store 6, which is not illustrated, is connected. The intermediate circuit thus comprises a first voltage level 14 and a second voltage level 15, wherein a potential difference between the first voltage level 14 and the second voltage level 15 corresponds to a voltage of the energy store 6. To rectify the voltages induced in the coils, two transistors embodied as MOSFETs 11, 12 are provided for each connection point 16, wherein in the exemplary embodiment illustrated, one p-channel MOSFET 12 each is provided between a connection point 16 and the first voltage level 14, which has a higher potential than the second voltage level 15, and one n-channel MOSFET 11 each is provided between a connection point 16 and the second voltage level 15. Enhancement-type MOSFETs 11, 12 are used in each case, wherein a flyback diode 21 is provided parallel to each MOSFET 11, 12.

To control the MOSFETs 11, 12, one operational amplifier 13 is provided for each MOSFET 11, 12, which amplifier is used as a comparator for comparing a voltage of the connection point 16 with a voltage of the voltage level 14, 15 to which the respective MOSFET 11, 12 connects the connection point 16. Thus, the respective MOSFET 11, 12 is switched, or becomes conductive, by means of the operational amplifier 13 precisely when a voltage between the connection point 16 and the first voltage level 14 is positive or when a voltage between the connection point 16 and the second voltage level 15 is negative. An undesired discharge of the energy store 6 by a current flow from the energy store 6 into the coil is thus prevented.

In the illustrated circuit 7, a supply of voltage to the operational amplifiers 13 occurs via the intermediate circuit or the energy store 6. If no energy is stored in the energy store 6, the MOSFETs 11, 12 are not switched by the operational amplifiers 13, since a sufficient supply voltage is not available to the operational amplifiers 13 in this case. As a result, a rectification of the voltage induced in the coils takes place via the flyback diodes 21 that are connected in parallel with the MOSFETs 11, 12. Therefore, when the energy store 6 is empty, the circuit only functions starting at a voltage that is higher than a threshold voltage of the diodes, typically starting at approximately 0.7 V. From this point on, the energy store 7 will be charged.

If energy is stored in the energy store 6, a voltage of this type is not necessary to overcome a threshold voltage of the diodes between the connection point 16 and the first voltage level 14 or second voltage level 15, since the operational amplifiers are supplied with energy from the energy store and can control the MOSFETs with a low voltage drop. Thus, even a voltage of 0.1 V, for example, can be rectified and used for energy consumption. In this manner, a particularly high efficiency can also be achieved at low rotational speeds.

FIG. 4 shows a further exemplary embodiment of a circuit 7 of an apparatus 1 according to FIG. 1. In contrast to the circuit 7 illustrated in FIG. 3, in this case only n-channel MOSFETs 11 are provided both between the connection points 16 and the first voltage level 14 and also between the connection points 16 and the second voltage level 15. Furthermore, an additional system voltage level 22 is provided which is connected to the intermediate circuit by a voltage converter, such as what is referred to as a step-up converter, which is not illustrated. As a result of the voltage converter, a higher voltage is present at the system voltage level 22 than at the first voltage level 14 of the intermediate circuit. In the illustrated circuit 7, a positive supply voltage for the operational amplifiers 13 is not, in contrast to the circuit 7 illustrated in FIG. 3, supplied by the first voltage level 14, but rather by the system voltage level 22. As is the case with the circuit 7 illustrated in FIG. 3, the second voltage level 15 can be used as a negative supply voltage for the operational amplifiers 13.

Because the operational amplifiers 13 in this case are not supplied with energy via the intermediate circuit, but rather via the system voltage level 22, a switching of the MOSFETs 11, 12 is, compared to the circuit 7 illustrated in FIG. 1, already possible at an intermediate circuit voltage that is lower than the threshold voltage of the diodes, even when the energy store 6 is empty. Thus, even with an empty energy store, a particularly high efficiency is already achieved starting at an intermediate circuit voltage of approximately 0.1 V, the threshold voltage of the MOSFETs.

By means of the step-up converter, a consistent voltage of approximately 2.8 V to 4.1 V is achieved at the system voltage level 22 starting at an intermediate circuit voltage of approximately 0.1 V, depending on the configuration. When the rotational speed or relative speed between the rotor 4 and stator 3 increases, the voltage in the intermediate circuit increases due to the increasing voltage in the coils of the stator 3, as a consequence of which a voltage difference between the system voltage level 22 and the intermediate circuit or the first voltage level 14 decreases as the rotational speed increases. If this voltage difference is less than 0.6 V, the MOSFETs 11 connected to the first voltage level 14 can no longer be switched by the operational amplifiers 13, whereby a voltage drop occurs. This is advantageous, since an excessive amount of energy is available anyway at high rotational speeds, so that damage to electrical consumers can be avoided.

FIG. 5 shows a further exemplary embodiment of a circuit 7 for an apparatus 1 according to FIG. 1. Similar to the circuit 7 illustrated in FIG. 3, p-channel MOSFETs 12 are once again provided between the connection points 16 and the first voltage level 14, and n-channel MOSFETs 11 are once again provided between the connection points 16 and the second voltage level 15. Unlike in the circuit 7 according to FIG. 3, a direct current voltage converter or step-up converter is provided in this circuit 7, which converter transforms a voltage of the intermediate circuit between the first voltage level 14 and second voltage level 15 to a higher level, so that a system voltage level 22 having a higher voltage is provided in order to supply the operational amplifiers 13 with energy even at a low intermediate circuit voltage. In this embodiment, as a result of the higher system voltage level 22, the n-channel MOSFETs 11 are already switched at a low intermediate circuit voltage, but a negative supply voltage for the operational amplifiers 13 would be required to switch the p-channel MOSFETs 12, for which reason the p-channel MOSFETs 12 between the connection points 16 and the first voltage level 14 are only switched by the operational amplifiers 13 at higher rotational speeds.

An apparatus 1 according to the invention enables a generation of electrical energy by a rotational movement with particularly high efficiency, since even low voltages which are achieved at low rotational speeds and with a small size can be utilized. As a result of the preferred use of a rotating electrical machine that is embodied to be brushless, high reliability, long service life, low wear and a particularly high efficiency are achieved. For example, what is referred to as a brushless direct current motor can be used. In addition, with an apparatus 1 according to the invention, it is ensured that a co-rotation by the rotor 4, and thus damage to the same from centrifugal forces, is prevented. The apparatus 1 can thus also be used in a wheel of a motor vehicle, for example, to supply energy to a tire pressure sensor and to a compressor for influencing the tire pressure. Compared to apparatuses 1 from the prior art, which generate electrical energy using a piezoelectric effect, a significantly greater energy yield can be achieved with an apparatus 1 according to the invention. As a result of the small installation footprint that can be achieved, the apparatus 1 according to the invention can be installed in the center of a rim on a motor vehicle, whereby an imbalance of the wheel is not increased and a visual appearance is not impaired.

The invention claimed is:

1. An apparatus for generating electrical energy from a rotational movement, comprising:
   a stator rotatable about a rotation axis;
   a rotor, rotatable about the rotation axis and connected to the stator, comprises a center of gravity located outside the rotation axis;
   a coil arranged in the stator for inducing an electrical voltage when the stator is rotated relative to the rotor; and
   an electrical circuit, which is connected to the coil and to an energy store, is configured for rectifying the voltage induced in the coil,
   wherein a position of a plane defined by the rotation axis and the center of gravity of the rotor is detected and the position of the plane is influenced by a current flow through the coil, so that a deflection of the plane from a vertical line is limited by the current flow when the stator rotates.

2. The apparatus according to claim 1, wherein a deflection of the plane is limited to a deflection angle of maximally 180° from a resting position.

3. The apparatus according to claim 1, wherein a distance of the center of gravity of the rotor from the rotation axis is equal to more than 10% of a maximum distance of the rotor from the rotation axis.

4. The apparatus according to claim 1 wherein the stator is embodied for a rotation about the rotation axis at a rotational speed of more than 100 rpm.

5. The apparatus according to claim 1, wherein a tilt sensor is provided to detect a slope of the rotation axis.

6. The apparatus according to claim 1, wherein a deflection of the plane can be influenced by energy from the energy store.

7. The apparatus according to claim 1, wherein two to six coils are provided in the stator.

8. The apparatus according to claim 1, wherein the electrical circuit comprises at least one transistor for rectifying the voltage induced in the coil.

9. The apparatus according to claim 8, further comprising an intermediate circuit and an operational amplifier,
wherein the operational amplifier is connected to the transistor and to the intermediate circuit and the coil so that a switching of the transistor by the operational amplifier depends on a voltage between the coil and the intermediate circuit.

10. The apparatus according to claim 8, wherein a microcontroller is provided for controlling the transistor.

11. The apparatus according to claim 1, wherein a voltage converter is provided to transform an output voltage of the intermediate circuit into a higher value.

12. A rim having an apparatus for generating electrical energy from a rotational movement, wherein the apparatus is embodied according to claim 1.

13. The rim according to claim 12, wherein the apparatus is arranged in a center of the rim so that a rotation axis of the rim coincides with the rotation axis of the stator.

14. The rim according to claim 13, wherein a sensor for detecting a physical property of a tire mounted on the rim is connected to the apparatus for the purpose of energy supply.

15. The rim according to claim 13, wherein a device for wireless data transmission is provided.

16. The rim according to claim 13, wherein a compressor for influencing a tire pressure is connected to the apparatus for the purpose of energy supply.

17. A method for generating electrical energy in a wheel of a motor vehicle with the apparatus according to claim 1, the apparatus being arranged in a rim of the wheel, the method comprising:
inducing electrical voltage in the coil when the stator is rotated relative to the rotor;
rectifying the electrical voltage induced in the coil;
detecting the position of the plane defined by the rotation axis and the center of gravity of the rotor; and
influencing the position of the plane via the current flow through the coil so that the deflection of the plane from a vertical line is limited by the current flow when the stator rotates.

18. The apparatus according to claim 2, wherein a deflection of the plane is limited to a deflection angle of maximally 90° from a resting position.

19. The apparatus according to claim 3, wherein a distance of the center of gravity of the rotor from the rotation axis is equal to more than 20% of a maximum distance of the rotor from the rotation axis.

20. The apparatus according to claim 19, wherein a distance of the center of gravity of the rotor from the rotation axis is equal to more than 40% of a maximum distance of the rotor from the rotation axis.

21. The apparatus according to claim 4 wherein the stator is embodied for a rotation about the rotation axis at a rotational speed of more than 500 rpm.

22. The apparatus according to claim 21 wherein the stator is embodied for a rotation about the rotation axis at a rotational speed of more than 1500 rpm.

23. The apparatus according to claim 7, wherein three coils are provided in the stator.

24. The apparatus according to claim 8, wherein the at least one transistor comprises a MOSFET.

25. The apparatus according to claim 11, wherein the voltage converter comprises a step-up converter.

26. The rim according to claim 14, wherein the sensor comprises a pressure sensor.

* * * * *